US005716430A

United States Patent [19]
Simmons

[11] Patent Number: 5,716,430
[45] Date of Patent: Feb. 10, 1998

[54] NITRATED POLYIMIDE GAS SEPARATION MEMBRANES

[75] Inventor: John Warren Simmons, Wilmington, Del.

[73] Assignee: L'Air Liquide Societe Anonyme Pour l'Etude et, l'Exploitation des Procedes Georges Claude, Paris, France

[21] Appl. No.: 643,245

[22] Filed: May 3, 1996

[51] Int. Cl.[6] ............................ B01D 71/64; B01D 69/12
[52] U.S. Cl. ........................ 96/13; 96/14; 210/500.39
[58] Field of Search ........................ 96/4, 7, 8, 10–14; 210/500.39

[56] References Cited

U.S. PATENT DOCUMENTS

| 4,732,586 | 3/1988 | Dick et al. | 96/14 |
|---|---|---|---|
| 4,952,220 | 8/1990 | Langsam et al. | 96/14 X |
| 4,988,371 | 1/1991 | Jeanes et al. | 96/13 X |
| 5,015,270 | 5/1991 | Ekiner et al. | 96/14 X |
| 5,042,993 | 8/1991 | Meier et al. | 96/14 X |
| 5,055,116 | 10/1991 | Kohn et al. | 96/14 X |
| 5,080,698 | 1/1992 | Krizan | 96/14 |
| 5,152,811 | 10/1992 | Sanders, Jr. et al. | 96/14 X |
| 5,178,940 | 1/1993 | Matsumoto et al. | 96/14 X |
| 5,232,471 | 8/1993 | Chen et al. | 55/16 |
| 5,232,472 | 8/1993 | Simmons et al. | 96/14 |
| 5,248,319 | 9/1993 | Ekiner et al. | 96/14 X |
| 5,286,539 | 2/1994 | Kusuki et al. | 96/13 X |
| 5,320,650 | 6/1994 | Simmons | 96/14 |
| 5,334,697 | 8/1994 | Simmons | 528/353 |

OTHER PUBLICATIONS

Ghosal, et al., *Journal of Polymer Science, Part B: Polymer Physics*, "The Effect of Aryl Nitration on Gas Sorption and Permeation in Polysulfone," 33, 657 (1995).

Ghosal and Chern, *Journal of Membrane Science*, "Aryl-Nitration of Poly(phenylene Oxide) and Polysulfone. Structural Characterization and Gas Permeability," 72, 91 (1992).

Kamps, et al., *Journal of Membrane Science*, "Gas Transport and Sub-$T_g$ Relaxations in Unmodified and Nitrated Polyarylethersulfones" 74, 193 (1992).

*Primary Examiner*—Robert Spitzer
*Attorney, Agent, or Firm*—Robert D. Touslee

[57] ABSTRACT

Useful gas separation membranes made from aromatic polyimides which comprise pendant nitro groups incorporated onto the phenyl backbone of the polymer. These polymers may be synthesized by the aryl nitration of the unsubstituted polyimides, or from the condensation reaction of aromatic diamines containing pendant nitro groups with aromatic dianhydrides, and are particularly useful in air separation.

16 Claims, No Drawings

NITRATED POLYIMIDE GAS SEPARATION MEMBRANES

FIELD OF THE INVENTION

The present invention relates to useful gas separation membranes made from aromatic polyimides which comprise pendant nitro groups incorporated onto the phenyl backbone of the polymer. These polymers may be synthesized by the aryl nitration of the unsubstituted polyimides, or from the condensation reaction of aromatic diamines containing pendant nitro groups with aromatic dianhydrides, and are particularly useful in air separation.

BACKGROUND OF THE INVENTION

The effects of aryl nitration on gas separation have been investigated for polysulfones, polyethersulfones, poly (phenylene oxide), and polyarylates.

Ghosal and Chern, Journal of Membrane Science, 72, 91 (1992) described the effects of aryl nitration of poly (phenylene oxide) on the gas permeability and permselectivity for a variety of gas pairs. Their results indicate that aryl nitration decreases the permeability for all gases, but increases the permselectivity for specific gas pairs. These results are related to changes in packing density, torsional mobility and interchain attractions due to the polar nitro group.

Kamps et al., Journal of Membrane Science, 74, 193 (1992) used aryl nitration to modify the gas separation properties of polysulfone and polyethersulfone. Their results described that generally, separation factors for gas mixtures of $CO_2/CH_4$ increased while the permeability decreased. Further, such decreasing diffusivity for both gases upon nitration could not be correlated with an increasing free-volume but was interpreted as a decrease in main-chain flexibility.

Ghosal et al., Journal of Polymer Science; Part B: Polymer Physics, 33, 657 (1995) describes certain effects of aryl nitration on the gas sorption and permeation of polysulfone. This reference concludes that permeability and diffusion coefficients for all gases decrease with an increasing degree of nitration. The decrease in gas diffusivity is attributed to a combination of decreased fractional free volume and decreased torsional mobility with increasing degree of substitution.

U.S. Pat. No. 5,232,471 discloses polyarylate membranes made from nitrated aromatic polyesters prepared by condensation of nitrated diacid chlorides with bisphenols. This patent states that the presence of aromatic nitrated dicarboxylic acid chlorides in the polymer chain impart improved gas separation properties to membranes formed from these materials.

Prior art has shown that the aryl nitration of a variety of aromatic polymers resulted in polymers with decreased gas permeabilities but increased permselectivities for a variety of gas pairs ($O_2/N_2$ and $CO_2/CH_4$). The permeability and diffusion coefficients for all gases was thus thought to decrease with increasing degree of nitro substitution.

SUMMARY OF THE INVENTION

The present invention relates to novel polyimide gas separation membranes, and the separation of at least one gas from a mixture of gases using such membranes. The polyimides are polymers or copolymers containing pendant nitro groups onto the phenyl backbone of the polyimide. The present invention further comprises the incorporation of pendant nitro groups onto the polymer backbone, resulting in polyimide membranes which exhibit superior gas separation properties.

In one sense the invention is a gas separation membrane formed from an aryl-nitrated aromatic polyimide where the polyimide backbone comprises at least one repeating unit of the formula:

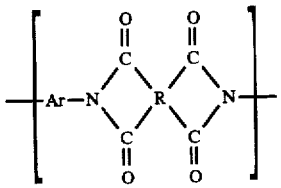

where —Ar— is an aromatic diamine moiety, and

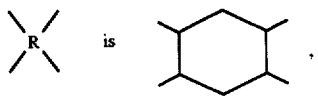

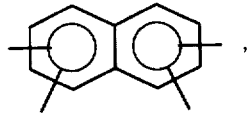

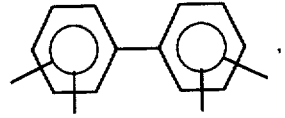

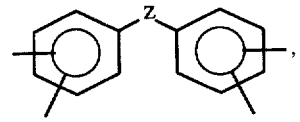

or mixtures thereof; and Z is

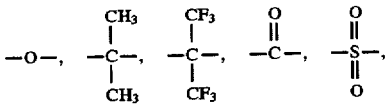

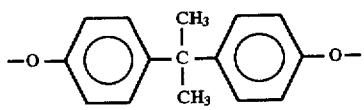

or mixtures thereof.

Preferably, the gas separation membrane aromatic diamine moiety —Ar— has the following formula:

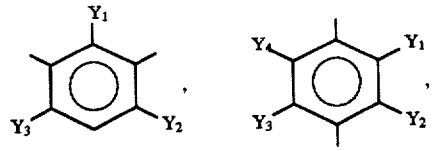

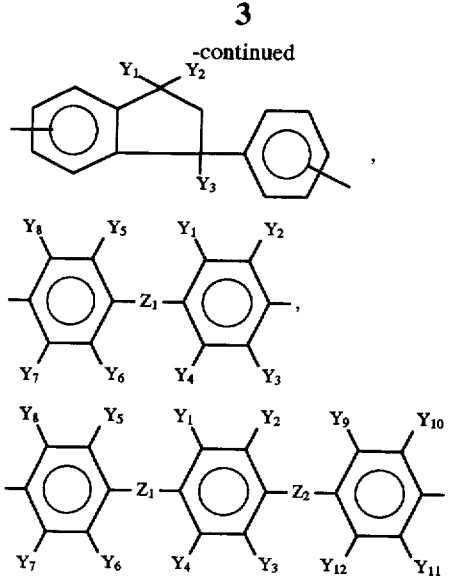

or mixtures thereof, where $Z_1$ and $Z_2$ are independently a carbon bond,

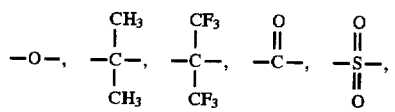

or alkylene groups of 1 to 5 carbon atoms; $Y_1$, $Y_2$, $Y_3$, $Y_4$, $Y_5$, $Y_6$, $Y_7$, $Y_8$, $Y_9$, $Y_{10}$, $Y_{11}$, and $Y_{12}$ independently are hydrogen, alkyl groups of 1 to 5 carbons, phenyl or phenoxy groups, or halogen.

Prior art teaches that aryl nitration of various polymers decreases the permeability for most gases, but increases the permselectivity for specific gas pairs. Surprisingly, however, I have found the nitrated polyimides in this invention generally have increased permeabilitities for most gases, and decreased permselectivities for specific $O_2/N_2$ gas pairs, when compared to the unnitrated polymer.

Polyimides are generally insoluble in most organic solvents. Also, through the aryl nitration of the polyimides of the present invention increases the solubility of these polymers in many organic solvents has been shown, therefore allowing for easier manufacture of a gas separation membrane. The polyimides of this invention exhibit superior permeability and permselectivity with respect to several gaseous mixtures and particularly with respect to mixtures of nitrogen and oxygen, such as found in the atmosphere.

DETAILED DESCRIPTION OF THE PREFERRED EMBODIMENTS

The present invention relates to the discovery that gas separation membranes made from polyimides which have compositionally incorporated a pendant nitro group(s) onto the polymer backbone, possess an excellent balance of relative gas permeation rates and selectivities between gases in a multicomponent gas mixture.

By this invention, it is discovered that the incorporation of pendant nitro groups onto the polymer backbone results in polyimide membranes which exhibit superior gas separation properties. In accordance with this invention, aryl nitration of a specific polyimide results in increased permeabilities for most gases, and generally decreased permselectivities for specific gas pairs.

The nitrated polyimides of this invention are generally more soluble in most organic solvents (specifically polar aprotic solvents such as N-methyl pyrrolidinone, N,N-dimethylacetamide, or dimethylsulfoxide, but also chlorinated solvents such as methylene chloride or chloroform). This property can be a significant benefit in the manufacture of gas separation membranes.

The nitrated polyimides of this invention may be synthesized by the aryl nitration of the unsubstituted polyimide using ammonium nitrate and trifluoroacetic anhydride. Such nitrated polyimides may also be synthesized by the condensation of aromatic diamines containing pendant nitro groups with aromatic dianhydrides. Another aspect of this invention is the aryl-nitration of a blend of two or more unsubstituted polyimides.

The gas separation membrane of the present invention may be an asymmetric membrane. In another embodiment, the present invention is a composite gas separation membrane wherein the separating layer is comprised of an aryl-nitrated aromatic polyimide.

Gas separation membranes prepared from the nitrated polyimides of this invention possess an excellent balance of gas permeation rates and selectivities of one gas over other gases in a multicomponent gas mixture. While not limiting the invention to any particular theory, the high gas permeability of these membranes is believed to be due to optimization of the molecular free volume in the polymer structure resulting from the incorporation of the nitro pendant groups into the polyimide chain. In particular, the nitro substituents on the polyimide increase the molecular free volume of the polymer.

The compositions of the present invention thus provide high productivity polyimide gas separation materials with good selectivity and high gas permeation rates. The polyimide materials of the present invention incorporate at least 10% (0.1 molar), preferably 50–100% or greater, pendant nitro groups onto the polyimide backbone chain. The polyimide can be made from any aromatic dianhydride with any aromatic diamine (or combination of aromatic dianhydrides and aromatic diamines); or, can be a blend of two or more distinctly different polyimides.

Generally, an inverse relationship between the gas permeation rate (flux) and the selectivity of said gas over other gases in a multicomponent gas mixture has been exhibited within polymer classes, such as polyimides. Because of this, previously known polyimide gas separation membranes tended to exhibit either high gas permeation rates at the sacrifice of high gas selectivities or high gas selectivities at the sacrifice of high gas permeation rates. It would be highly desirable for gas separation membranes to exhibit high gas permeation rates while maintaining high gas selectivities.

The present invention improves and advances the above short-coming in the art of gas separation polymers and provides exceptionally high permeation polyimide gas separation membranes while maintaining good selectivity. Polyimide materials useful in the preparation of the aryl nitrated polyimides contain the repeating unit

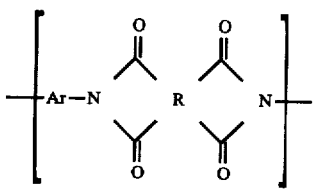

where —Ar— is of any aromatic diamine moiety or combination of aromatic diamine moieties. R can be comprised of any aromatic dianhydride or mixture of aromatic dianhydrides. Nitration of the polyimide generally occurs on the diamine, favoring attack at the position ortho to the site of highest electron density. The presence of nitro group may be confirmed by infrared (IR) spectroscopy. An example is shown in the following, where diamine is oxydianiline (ODA):

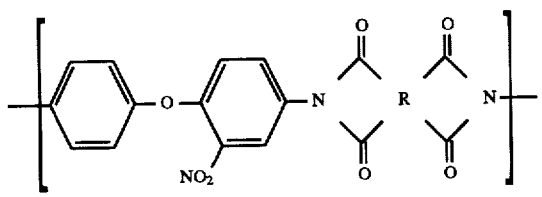

In general, the polyimides of this invention have a weight average molecular weight within the range of from about 23,000 up to about 400,000, preferably from about 50,000 up to about 280,000.

In the preferred process for preparing the unnitrosubstituted polyimides of this invention, approximately equimolar quantities of a dianhydride and a diamine are reacted by well-established procedures in the art. In general, this preparation process involves the polycondensation of the diamine and the dianhydride followed by the dehydration of the resulting polyamic acid to form polyimide.

In the preferred process for the aryl nitration of the polyimide, the polyimide is nitrated by the following method.

Preferably, the polyimide is first dissolved (preferably 1–10 weight percent) in a chlorinated hydrocarbon solvent such as methylene chloride ($CH_2Cl_2$) or chloroform ($CHCl_3$). However, other solvents can be used for the nitrations, such as acetonitrile, nitromethane, or sulfolane. Nitrations carried out in polar solvents proceed at a faster rate than in solvents of lower dielectric constant because of the greater solubility of inorganic salts in these solvents. The polymer need not always be completely dissolved in the solvent. In fact, nitration of the polyimide may even be achieved when the polyimide is essentially insoluble in the solvent.

Ammonium nitrate, between 0.1 to 2.5 molar equivalents, preferably 1 molar equivalent, is dissolved in the stirred polyimide solution (or slurry). Thereafter, a 3–4 fold molar excess of trifluoroacetic anhydride is added dropwise to the mechanically stirred solution, maintained under anhydrous conditions at a temperature of between 0°–80° C., preferably 0°–25° C. The solution is then stirred at this temperature until nitration is complete, normally 2–24 hours. The polyimide may then be recovered from solution by precipitation with alcohol (e.g., methanol) and washed with additional alcohol or water.

The nitrated polyimides can also be synthesized using nitro-substituted aromatic diamines and condensing them with aromatic dianhydrides to form a polyamic acid. The polyamic acid can be cyclized to the polyimide by either thermal or chemical imidization procedures.

The resulting polyimides may then, if desired, be blended using conventional solution blending technology to yield a blend having specifically tailored properties. Alternatively, a blend of two distinctly different aromatic polyimides can be nitrated using the above procedure.

TABLE 1

Gas Permeation Data for Nitrated Polyimides

| Example | Diamine 1 | Diamine 2 | Mole % 1/ Mole % 2 | Dianhy 1 | Dianhy 2 | Mole % 1/ Mole % 2 | Molar —$NO_2$ | Inherent Viscosity | Permeability Barriers | Selectivity $O_2/N_2$ |
|---|---|---|---|---|---|---|---|---|---|---|
| 1* | A | — | 100 | Z | — | 100 | — | 0.66 | 1.30 | 7.1 |
| Nitrated 1 | " | | " | " | | " | 1 | 0.53 | 2.30 | 6.87 |
| 2 | A | B | 50/50 | Z | — | 100 | — | 0.64 | 1.57 | 7.61 |
| Nitrated 2 | | | | | | | 1 | 0.69 | 1.53 | 7.77 |
| 3 | A | B | 50/50 | Y | — | 100 | — | 0.80 | 1.53 | 7.47 |
| Nitrated 3 | | | | | | | 1 | 0.74 | 2.15 | 6.79 |
| 4 | B | — | 100 | X | Y | 50/50 | — | 0.72 | 2.84 | 6.99 |
| Nitrated 4 | | | | | | | 1 | 0.69 | 3.83 | 6.14 |
| 5 | C | — | 100 | Y | — | 100 | — | 0.88 | 3.07 | 6.78 |
| Nitrated 5 | | | | | | | 1 | 0.83 | 4.43 | 6.32 |
| 6 | C | — | 100 | V | — | 100 | — | 1.30 | 2.82 | 6.49 |
| Nitrated 6 | | | | | | | 1 | 1.26 | 3.23 | 6.15 |
| 7 | A | C | 50/50 | Y | — | 100 | — | 0.71 | 2.76 | 6.77 |
| Nitrated 7 | | | | | | | 1 | 0.69 | 3.74 | 6.00 |
| 8 | B | C | 50/50 | Y | — | 100 | — | 0.80 | 2.29 | 7.24 |
| Nitrated 8 | | | | | | | 1 | 0.84 | 3.84 | 6.26 |
| 9 | C | D | 90/10 | Y | — | 100 | — | 0.87 | 2.57 | 6.99 |
| Nitrated 9 | | | | | | | 1 | 1.01 | 3.66 | 6.33 |
| 10 | C | E | 75/25 | Y | — | 100 | — | 0.87 | 4.88 | 6.34 |
| $NO_2$ 10 | | | | | | | 1 | 0.85 | 5.14 | 6.70 |
| 2-$NO_2$ 10 | | | | | | | 2 | 0.76 | 4.32 | 7.06 |
| Blend 1 | Mat | Ultem | 60/40 | " | " | " | | | 1.28 | 7.35 |
| $NO_2$ B-1 | " | " | " | | | | 1 | 0.48 | 1.12 | 7.77 |
| Blend 2 | Mat | Ultem | 75/25 | " | " | " | | | 1.72 | 7.00 |
| $NO_2$ B-2 | " | " | " | | | | 1 | 0.50 | 1.31 | 7.65 |

TABLE 1-continued

| | | | Gas Permeation Data for Nitrated Polyimides | | | | | | | |
|---|---|---|---|---|---|---|---|---|---|---|
| Example | Diamine 1 | Diamine 2 | Mole % 1/ Mole % 2 | Dianhy 1 | Dianhy 2 | Mole % 1/ Mole % 2 | Molar —$NO_2$ | Inherent Viscosity | Permeability Barrers | Selectivity $O_2/N_2$ |
| Blend 3 | Mat | Ultem | 50/50 | | | | | | 0.73 | 8.10 |
| $NO_2$ B-2 | " | " | " | | | | 1 | 0.46 | 0.63 | 8.01 |

* = Matrimid (Ciba-Geigy polyimide)
Mat = Matrimid
Ultem = Ultem 1000 (GE polyimide)
A = 5,x-(4-aminophenyl)-1,1,3-trimethylindane (DAPI)
B = 1,4-bis-(4-aminophenyl)-2-t-butylbenzene (2-t-Bu-APB-144)
C = 4,4'-(4-aminophenoxy)-3,3'-di-t-butylbiphenyl (APDBBP)
D = 1,3-diamino-2-hydroxypropane (DAHP)
E = 2,4-diaminomesitylene (DAM)
Z = BTDA (benzophenone tetracarboxylic dianhydride)
Y = DSDA (5,5'-sulfonylbis-1,3-isobenzofurandione, diphenylsulfone tetracarboxylic dianhydride)
X = 6FDA [4,4'-(2,2,2-trifluoro-1-(trifluoromethyl)ethylidene)bis(1,2-benzenedicarboxylic acid dianhydride)
V = BPADA (bisphenol A tetracarboxylic dianhydride)

General Nitration Procedure

A 250 mL 3-necked round bottomed flask, equipped with a mechanical stirrer and a nitrogen inlet, was flame dried under a nitrogen atmosphere and allowed to cool to ambient temperature. The polyimide (0.01 molar equivalent) was added to the flask and dissolved (or slurried) in roughly 100mL of chloroform. Ammonium nitrate (generally 0.80 g, 0.010 moles) was then added to the solution, and the solution was stirred until the ammonium nitrate had dissolved. The trifluoroacetic anhydride (TFAA) was then added dropwise over a 10 minute period and the solution was stirred for 2–24 hours at room temperature.

The polymer was then precipitated into methanol, ground up in a blender, washed with methanol (3×) and then water (1×). The polymer was air-dried at room temperature overnight, then further dried in a 150° C. vacuum oven for at least 2 hours.

A film of the above polyimide was cast from roughly 20 wt. solution in NMP onto a glass plate at 120° C. with a 15-mil ($38 \times 10^{-5}$ m) knife gap. The film was dried on the plate at 120° C. for 1–2 hours, removed from the plate, cooled to room temperature and air-dried overnight. The film was further dried in a vacuum oven (roughly 20 inches mercury) at 230° C. for 18 hours.

The film (film thickness between 1–2 mils) was tested for mixed gas $O_2/N_2$ (21/79 mole ratio) permeabilities at 500 psig ($34.5 \times 10^{-5}$ Pa), 5° C.

EXAMPLE 1

Procedure for Nitration of Polyimide 1 (Matrimid)

A 250 mL 3-necked round bottomed flask, equipped with a mechanical stirrer and a nitrogen inlet, was flame dried under a nitrogen atmosphere and allowed to cool to ambient temperature. The polyimide, Matrimid, (0.01 molar equivalent, 5.53 g) was added to the flask and dissolved in 70 mL of chloroform. Ammonium nitrate (0.80 g, 0.010 moles) was added to the solution, and the solution was stirred until the ammonium nitrate had dissolved. The trifluoroacetic anhydride (TFAA, 10.0 g) was then added dropwise over a 10 minute period and the solution was stirred for 16 hours at room temperature.

The polymer was then precipitated into methanol, ground up in a blender, washed with methanol (3×) and then water (1×). The polymer was air-dried at room temperature overnight, then further dried in a vacuum oven (20 inches mercury) at 150° C. for at 2 hours to yield 5.4 g polymer (I.V.=0.53, 0.5 wt. % polymer in NMP, dL/g).

A film of the above polyimide was cast from 20 wt. % solution in NMP onto a glass plate at 120° C. with a 15-mil ($38 \times 10^{-5}$ m) knife gap. The film was dried on the plate at 120° C. for 1–2 hours, removed from the plate, cooled to room temperature and air-dried overnight. The film was further dried in a vacuum oven (roughly 20 inches mercury) at 230° C. for 18 hours.

The film (film thickness between 1.5 mils) was tested for mixed gas $O_2/N_2$ (21/79 mole ratio) permeabilities at 500 psig ($34.5 \times 10^{-5}$ Pa). 5° C. The results are reported below:

$O_2$ Productivity: 2.30 Barrer $O_2/N_2$ Selectivity: 6.87

EXAMPLE 2

Procedure for Nitration of Polyimide 3

(Polyimide: DAPI/2-t-Bu (1:1)+DSDA)

Synthesis of Polyimide:

To a stirred solution of 5,x-amino-(4-aminophenyl)-1,1,3-trimethylindane (DAPI, 0.015 moles, 5.227 g) and 1,4-bis-(4-aminophenoxy)-2-t-butylbenzene (2-t-Bu, 0.015 moles, 3.996 g) in NMP (90 mL) was added 5,5'-sulfonylbis-1,3-isobenzofurandione (DSDA, diphenylsulfone tetracarboxylic dianhydride, 0.030 moles, 10.748 g) under an inert atmosphere at room temperature. The tan solution was allowed to stir overnight at room temperature. Triethylamine (0.070 moles, 7.0 g), and acetic anhydride (0.070 moles, 7.0 g) were added with rapid stirring at room temperature. The reaction mixture was heated to 100° C. for 2 hours. After cooling the reaction mixture to room temperature, the polymer was precipitated in water. The polymer was washed with water and methanol. The polymer was air-dried overnight at room temperature and then dried in a vacuum oven (20 inches mercury) at 230° C. for 2 hours to yield 18.5 g of polymer (I.V.=0.80, 0.5 wt. % polymer in NMP, dL/g).

A film of the above polyimide was cast from 20 wt. % solution in NMP onto a glass plate at 120° C. with a 15-mil ($38 \times 10^{-5}$ m) knife gap. The film was dried on the plate at 120° C. for 1–2 hours, removed from the plate, cooled to room temperature and air-dried overnight. The film was further dried in a vacuum oven (roughly 20 inches mercury) at 230° C. for 18 hours.

The film (film thickness between 1.86 mils) was tested for mixed gas $O_2/N_2$ (21/79 mole ratio) permeabilities at 500 psig ($34.5 \times 10^{-5}$ Pa), 5° C. The results are reported below:

O$_2$ Productivity: 1.53 Barrer

O$_2$/N$_2$ Selectivity: 7.47

Nitration of Polyimide 3

A 250 mL 3-necked round bottomed flask, equipped with a mechical stirrer and a nitrogen inlet, was flame dried under a nitrogen atmosphere and allowed to cool to ambient temperature. The polyimide, [DAPI/2-t-Bu (1:1)+DSDA], (0.01 molar equivalent, 6.30 g ) was added to the flask and dissolved in 70 mL of chloroform. Ammonium nitrate (0.80 g, 0.010 moles) was added to the solution, and the solution was stirred until the ammonium nitrate had dissolved. The trifluoroacetic anhydride (TFAA, 7.5 g) was then added dropwise over a 10 minute period and the solution was stirred for 16 hours at room temperature.

The polymer was then precipitated into methanol, ground up in a blender, washed with methanol (3×) and then water (1×). The polymer was air-dried at room temperature overnight, then further dried in a vacuum oven (20 inches mercury) at 150° C. for at 2 hours to yield 5.4g polymer (I.V.=0.74, 0.5 wt. % polymer in NMP, dL/g).

A film of the above polyimide was cast from 20 wt. % solution in NMP onto a glass plate at 120° C. with a 15-mil (38×10$^{-5}$ m) knife gap. The polymer solution was filtered through a 5 micron PTFE filter prior to film casting. The film was dried on the plate at 120° C. for 1-2 hours, removed from the plate, cooled to room temperature and air-dried overnight. The film was further dried in a vacuum oven (roughly 20 inches mercury) at 230° C. for 18 hours.

An IR spectrum showed a weak band at 1521 cm$^{-1}$ and a stronger band at 1350 cm$^{-1}$, consistent with the presence of a nitro group.

The film (film thickness between 1.5 mils) was tested for mixed gas O$_2$/N$_2$ (21/79 mole ratio) permeabilities at 500 psig (34.5×10$^{-5}$ Pa), 5° C. The results are reported below:

O$_2$ Productivity: 2.15 Barrer

O$_2$/N$_2$ Selectivity: 6.79

EXAMPLE 3

Nitration of Blend 1 [Matrimid/Ultem (3:2)]

A 250 mL 3-necked round bottomed flask, equipped with a mechical stirrer and a nitrogen inlet, was flame dried under a nitrogen atmosphere and allowed to cool to ambient temperature. The polyimides, Matrimid (0.006 molar equivalent, 3.31 g) and Ultem (0.004 molar equivalent, 2.37 g ) were added to the flask and dissolved in 80 mL of chloroform. Ammonium nitrate (0.80 g, 0.010 moles) was added to the solution, and the solution was stirred until the ammonium nitrate had dissolved. The trifluoroacetic anhydride (TFAA, 10.0 g) was then added dropwise over a 10 minute period and the solution was stirred for 12 hours at room temperature.

The polymer was then precipitated into methanol, ground up in a blender, washed with methanol (3×) and then water (1×). The polymer was air-dried at room temperature overnight, then further dried in a vacuum oven (20 inches mercury) at 150° C. for at 2 hours to yield 5.4 g polymer (I.V.=0.48, 0.5 wt. % polymer in NMP, dL/g).

A film of the above polyimide blend was cast from 20 wt. % solution in NMP onto a glass plate at 120° C. with a 15-mil (38×10$^{-5}$ m) knife gap. The polymer solution was filtered through a 5 micron PTFE filter prior to film casting. The film was dried on the plate at 120° C. for 1-2 hours, removed from the plate, cooled to room temperature and air-dried overnight. The film was further dried in a vacuum oven (roughly 20 inches mercury) at. 230° C. for 18 hours.

An IR spectrum showed a weak band at 1521 cm$^{-1}$ and a stronger band at 1350 cm$^{-1}$, consistent with the presence of a nitro group.

The film (film thickness between 1.5 mils) was tested for mixed gas O$_2$/N$_2$ (21/79 mole ratio) permeabilities at 500 psig (34.5×10$^{-5}$ Pa), 5° C. The results are reported below:

O$_2$ Productivity: 1.12 Barrer

O$_2$/N$_2$ Selectivity: 7.77

I claim:

1. A gas separation membrane formed from an arylnitrated aromatic polyimide wherein the polyimide backbone comprises at least one repeating unit of the formula:

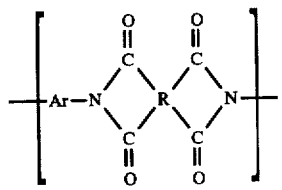

where —Ar— is an aromatic diamine moiety, and

 is

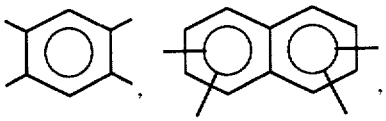,

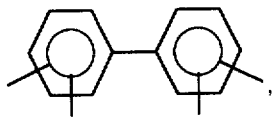,

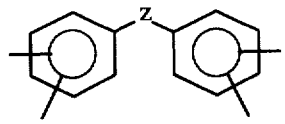, or mixtures thereof; and Z is

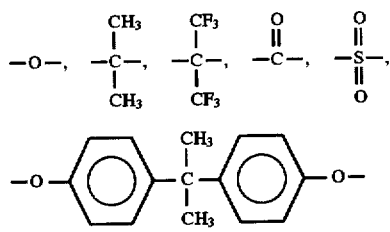

or mixtures thereof.

2. The gas seperation membrane of claim 1 where the aromatic diamine moiety, —Ar—, has the following formula:

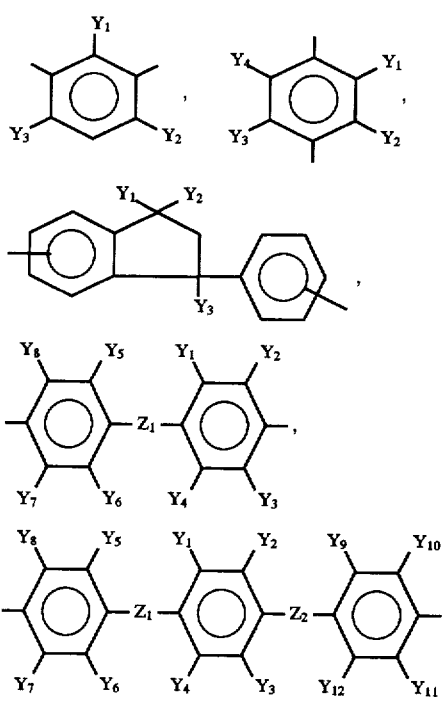

or mixtures thereof, where $Z_1$ and $Z_2$ are independently a carbon bond,

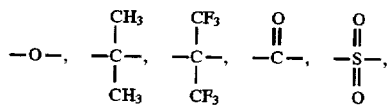

or alkylene groups of 1 to 5 carbon atoms; $Y_1$, $Y_2$, $Y_3$, $Y_4$, $Y_5$, $Y_6$, $Y_7$, $Y_8$, $Y_9$, $Y_{10}$, $Y_{11}$, and $Y_{12}$ independently are hydrogen, alkyl groups of 1 to 5 carbons, phenyl or phenoxy groups, or halogen.

3. The gas seperation membrane of claim 2 wherein each Y are hydrogen.

4. The gas seperation membrane of claim 2 wherein —Ar— is:

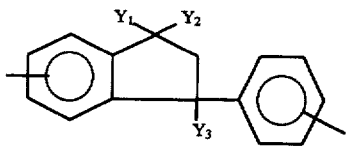

5. The gas separation membrane of claim 4 wherein $Y_1$, $Y_2$, and $Y_3$ are methyl.

6. The gas separation membrane of claim 4 where R is

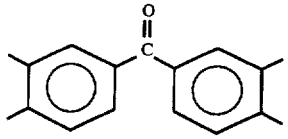

7. The gas separation membrane of claim 2 wherein —Ar— is

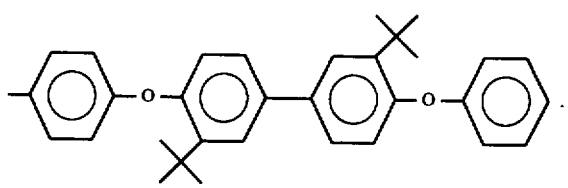

8. The gas separation membrane of claim 7 where R is

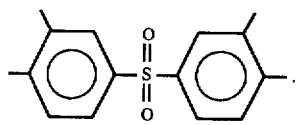

9. The gas separation membrane of claim 7 where R is

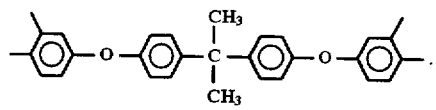

10. The gas separation membrane of claim 1 where —Ar— is

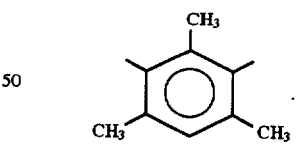

11. The gas separation membrane of claim 1 where the aromatic polyimide has the following chemical formula:

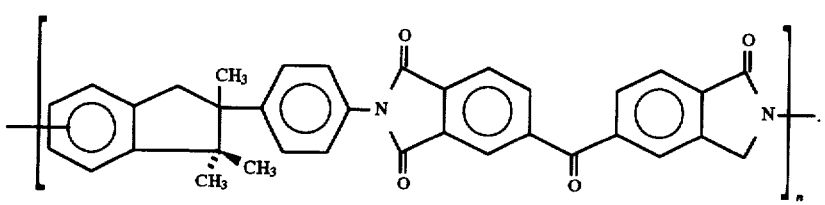

12. The gas separation membrane of claim 1 where the aromatic polyimide has the following chemical formula:

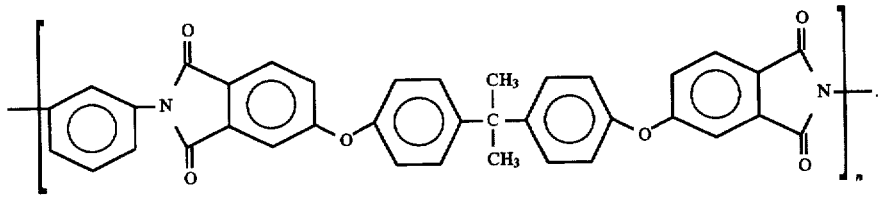

13. The gas separation membrane of claim 1 wherein the aryl-nitrated aromatic polyimide is formed by polycondensation of a nitrated aromatic diamine with an aromatic dianhydride.

14. The gas separation membrane of claim 1 wherein the membrane is an asymmetric membrane.

15. A gas separation membrane formed from a blend of at least two aryl-nitrated aromatic polyimides.

16. A composite gas separation membrane wherein the separating layer is comprised of an aryl-nitrated aromatic polyimide.

* * * * *